(12) United States Patent
Choi et al.

(10) Patent No.: US 6,976,897 B2
(45) Date of Patent: Dec. 20, 2005

(54) FIELD EMISSION ARRAY WITH CARBON NANOTUBES AND METHOD FOR FABRICATING THE FIELD EMISSION ARRAY

(75) Inventors: Won-bong Choi, Suwon (KR); Min-jae Yun, Taejeon (KR); Yong-wan Jin, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 258 days.

(21) Appl. No.: 10/658,526

(22) Filed: Sep. 10, 2003

(65) Prior Publication Data

US 2004/0045817 A1 Mar. 11, 2004

Related U.S. Application Data

(62) Division of application No. 09/837,225, filed on Apr. 19, 2001, now Pat. No. 6,642,639.

(30) Foreign Application Priority Data

Apr. 26, 2000 (KR) .................................. 00-22164

(51) Int. Cl.⁷ .............................. H01J 9/20; H01J 1/02
(52) U.S. Cl. ........................ 445/24; 313/309; 313/311; 313/495
(58) Field of Search .......................... 445/24, 25, 49, 445/50, 51; 313/309, 313, 311, 336, 495, 313/496, 497

(56) References Cited

U.S. PATENT DOCUMENTS

| | | | | |
|---|---|---|---|---|
| 5,763,997 A | * | 6/1998 | Kumar | 313/495 |
| 5,973,444 A | * | 10/1999 | Xu et al. | 313/309 |
| 6,097,137 A | * | 8/2000 | Forsdyke et al. | 313/161 |
| 6,097,138 A | | 8/2000 | Nakamoto | |
| 6,184,627 B1 | * | 2/2001 | Hamada et al. | 315/169.4 |
| 6,239,547 B1 | * | 5/2001 | Uemura et al. | 313/495 |
| 6,307,327 B1 | * | 10/2001 | Xie et al. | 315/169.4 |
| 6,333,598 B1 | * | 12/2001 | Hsu et al. | 313/495 |
| 6,414,444 B2 | * | 7/2002 | Fox et al. | 315/169.3 |
| 6,440,761 B1 | * | 8/2002 | Choi | 438/20 |
| 6,448,709 B1 | * | 9/2002 | Chuang et al. | 313/497 |
| 6,498,424 B1 | * | 12/2002 | Saito et al. | 313/309 |

(Continued)

FOREIGN PATENT DOCUMENTS

EP 1 022 764 A1 7/2000

(Continued)

OTHER PUBLICATIONS

Wang, et al., "A Nanotube-based Field . . . ", Applied Physics Letters, 72(22):2912-2913, (Jun. 1, 1998).

Primary Examiner—Kamand Cuneo
Assistant Examiner—Dameon E. Levi
(74) Attorney, Agent, or Firm—Lee & Morse, P.C.

(57) ABSTRACT

A field emission array adopting carbon nanotubes as an electron emitter source, wherein the array includes a rear substrate assembly including cathodes formed as stripes over a rear substrate and carbon nanotubes; a front substrate assembly including anodes formed as stripes over a front substrate with phosphors being deposited on the anodes, a plurality of openings separated by a distance corresponding to the distance between the anodes in a nonconductive plate, and gates formed as stripes perpendicular to the stripes of anodes on the nonconductive plate with a plurality of emitter openings corresponding to the plurality of openings. The nonconductive plate is supported and separated from the front substrate using spacers. The rear substrate assembly is combined with the front substrate assembly such that the carbon nanotubes on the cathodes project through the emitter openings.

13 Claims, 5 Drawing Sheets

U.S. PATENT DOCUMENTS

| | | | |
|---|---|---|---|
| 6,515,415 B1 * | 2/2003 | Han et al. | 313/496 |
| 6,568,979 B2 * | 5/2003 | Hsu | 445/24 |
| 6,642,639 B2 * | 11/2003 | Choi et al. | 313/309 |
| 6,733,355 B2 * | 5/2004 | Hwang et al. | 445/24 |
| 6,774,548 B2 * | 8/2004 | Fran et al. | 313/309 |
| 6,809,465 B2 * | 10/2004 | Jin | 313/310 |
| 6,864,162 B2 * | 3/2005 | Jin | 438/551 |

FOREIGN PATENT DOCUMENTS

| | | |
|---|---|---|
| EP | 1 073 090 A2 | 1/2001 |
| GB | 2355849 A | 5/2001 |

* cited by examiner

FIELD EMISSION ARRAY WITH CARBON NANOTUBES AND METHOD FOR FABRICATING THE FIELD EMISSION ARRAY

CROSS REFERENCE TO RELATED APPLICATION(S)

This is a divisional application based on application Ser. No. 09/837,225, filed Apr. 19, 2001 now U.S. Pat. No. 6,642,639, the entire contents of which is hereby incorporated by reference.

BACKGROUND OF THE INVENTION

1. Field of the Invention

The present invention relates to a field emission array with carbon nanotubes as an electron emitter source, instead of conventional micro tips. The present invention further relates to a method for fabricating the field emission array of the present invention.

2. Description of the Related Art

In recent years, many attempts have been made to adopt carbon nanotubes as an electron emitter source in electron emission devices, instead of metallic micro tips, because the carbon nanotubes are superior in durability and thermal stability with a low work function. For such triode-type electron emission devices with carbon nanotubes, the complicated fabrication process associated with thin film formation is considered a drawback. Additionally, there is a problem of generating impurity gas inside a packaged device during operation.

SUMMARY OF THE INVENTION

To solve the aforementioned problems, it is a feature of an embodiment of the present invention to provide a field emission array using carbon nanotubes as an electron emitter source, and a method for fabricating the field emission array, in which a nonconductive substrate with gates is built-in to a front substrate, and a rear substrate with cathodes and carbon nanotubes deposited on the cathodes, is combined with the front substrate assembly having the nonconductive substrate, so that the overall thin film formation becomes easy without causing generation of an impurity gas inside the field emission array during operation.

According to an aspect of an embodiment of the present invention, there is provided a field emission array comprising: a rear substrate assembly including a rear substrate; cathodes formed as stripes over the rear substrate; and carbon nanotubes formed on the cathodes at a predetermined distance; and a front substrate assembly including a front substrate; anodes formed as stripes over the front substrate; phosphors deposited on the anodes; a nonconductive plate having a plurality of openings separated by a predetermined distance corresponding to the distance between each of the anodes; gates formed as stripes perpendicular to the stripes of anodes on the nonconductive plate with a plurality of emitter openings corresponding to the plurality of openings in the nonconductive plate; and spacers for supporting and separating the nonconductive plate having the gates from the rear substrate by a predetermined distance, wherein the rear substrate assembly and the front substrate assembly are combined so that the carbon nanotubes on the cathodes project through the emitter openings at a predetermined distance from the gates.

In another embodiment, there is provided a field emission array comprising: a rear substrate assembly including a rear substrate; cathodes formed as stripes over the rear substrate; and carbon nanotubes formed on the cathodes at a predetermined distance; and a front substrate assembly including a front substrate; anodes formed as stripes over the front substrate; phosphors deposited on the anodes; upper and lower nonconductive plates each having a plurality of openings separated from each other by a predetermined distance corresponding to the distance between each of the anodes; gates formed as stripes perpendicular to the stripes of anodes on the lower nonconductive plate with a plurality of emitter openings corresponding to the plurality of openings in the nonconductive plate, wherein the distance between the gates and the carbon nanotubes is reduced; and spacers for supporting and separating the upper nonconductive plate from the rear substrate by a predetermined distance, wherein the rear substrate assembly and the front substrate assembly are combined so that the carbon nanotubes on the cathodes project through the emitter openings at a predetermined distance from the gates.

In still another embodiment, there is provided a field emission array comprising: a rear substrate assembly including a rear substrate; cathodes formed as stripes over the rear substrate; and carbon nanotubes formed on the cathodes with a predetermined distance from each other; and a front substrate assembly including a front substrate; anodes formed as stripes over the front substrate; phosphors deposited on the anodes; a nonconductive plate having a plurality of openings separated from each other by a predetermined distance corresponding to the distance between each of the anodes; gates formed as stripes perpendicular to the stripes of anodes over the nonconductive plate extending the upper sidewalls of the nonconductive plate which are exposed through the plurality of openings in the nonconductive plate; and spacers for supporting and separating the nonconductive plate having the gates from the rear substrate by a predetermined distance, wherein the rear substrate assembly and the front substrate assembly are combined so that the carbon nanotubes on the cathodes project through the emitter openings at a predetermined distance from the gates.

According to another aspect of the present invention, there is provided a method for fabricating a field emission array, comprising: forming a rear substrate assembly including a rear substrate; cathodes formed as stripes over the rear substrate; and carbon nanotubes formed on the cathodes at a predetermined distance; forming a front substrate assembly including a front substrate; anodes formed as stripes over the front substrate; phosphors deposited on the anodes; a nonconductive plate having a plurality of openings separated from each other by a predetermined distance corresponding to the anodes; gates formed as stripes perpendicular to the stripes of anodes on the nonconductive plate with a plurality of emitter openings corresponding to the plurality of openings in the nonconductive plate; and spacers for supporting and separating the nonconductive plate having the gates from the rear substrate by a predetermined distance; and combining the rear substrate assembly and the front substrate assembly so that the carbon nanotubes on the cathodes project through the emitter openings at a predetermined distance from the gates.

It is preferable that forming the front substrate assembly comprises: depositing a metal layer over the front substrate and patterning the metal layer into the anodes as stripes; depositing the phosphors on the anodes; forming the gates as stripes on the nonconductive plate; and combining the nonconductive plate having the gates with the front substrate having the anodes and the phosphors using spacers so that the nonconductive plate and the front substrate are separated by a predetermined distance. In this case, forming the gates as stripes on the nonconductive plate may comprise: forming a plurality of openings separated by a predetermined distance in the nonconductive plate; and depositing a metal layer over the nonconductive plate having the plurality of openings and patterning the metal layer into the gates as stripes having the plurality of emitter openings corresponding to the plurality of openings.

It is preferable that forming the gates as stripes on the nonconductive plate comprises: forming a plurality of openings separated from each other by a predetermined distance in a lower nonconductive plate; depositing a metal layer on the lower nonconductive plate having the plurality of openings and patterning the metal layer into the gates as stripes having a plurality of emitter openings corresponding to the openings in the nonconductive plate; and mounting an upper nonconductive plate having a plurality of openings on the lower nonconductive plate having the gates such that the plurality of openings of the upper nonconductive plate correspond to each of the emitter openings. Alternatively, forming the gates as stripes on the nonconductive plate comprises: forming a plurality of openings separated by a predetermined distance in a lower nonconductive plate; and depositing a metal layer by a spint method on the top and upper sidewalls of the lower nonconductive plate which are exposed through the plurality of openings, and patterning the metal layer into the gates as stripes having a plurality of emitter openings corresponding to the openings.

BRIEF DESCRIPTION OF THE DRAWINGS

The above features and advantages of the embodiments of the present invention will become more apparent by describing in detail preferred embodiments thereof with reference to the attached drawings in which.

DETAILED DESCRIPTION OF THE INVENTION

Korean Patent Application Number 00-22164, filed Apr. 26, 2000, and entitled: "Field Emission Array with Carbon Nanotubes and Method for Fabricating the Field Emission Array," is incorporated by reference herein in its entirety.

Figure 1:
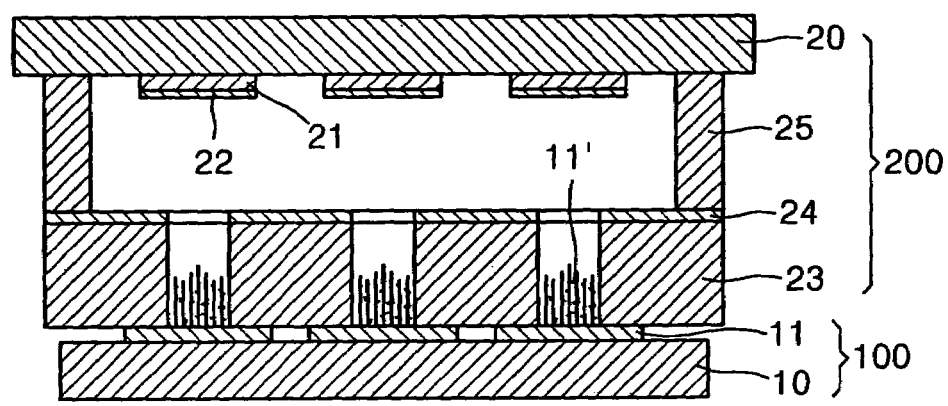
FIGS. 1 through 3 are sectional views illustrating a first, a second and a third embodiment of a field emission array with carbon nanotubes according to the present invention.
Figure 2:
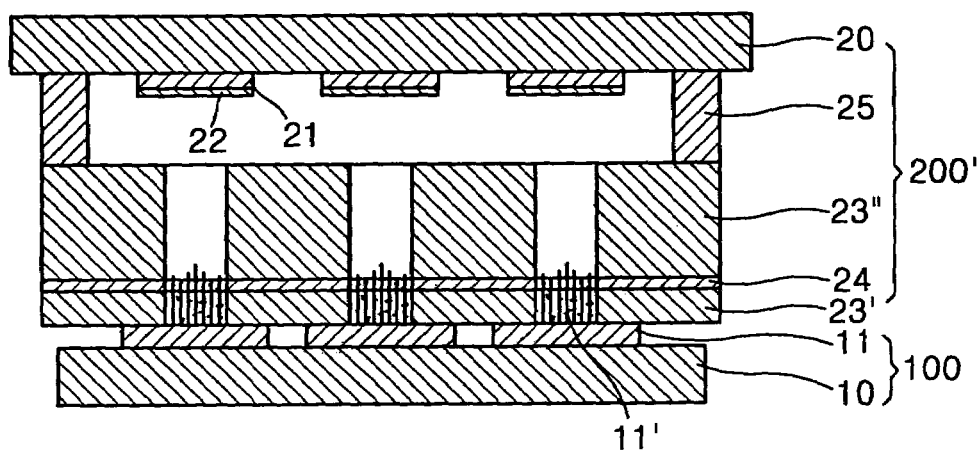
Figure 3:
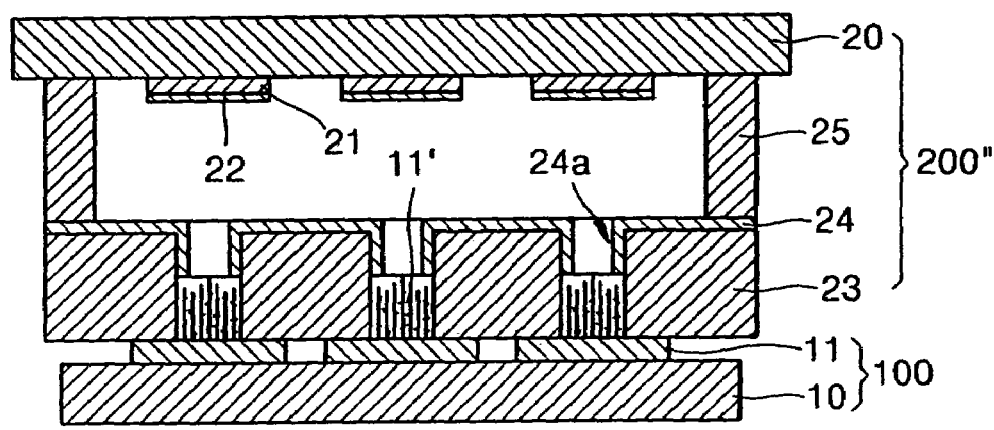

Preferred embodiments of a field emission array using carbon nanotubes as an electron emitter source according to the present invention are illustrated in FIGS. 1 through 3. As shown in FIGS. 1 through 3, the field emission arrays include a rear substrate assembly 100 and a front substrate assembly 200. In the rear substrate assembly 100, a plurality of cathodes 11 are formed as stripes over a rear substrate 10, and carbon nanotubes 11' are deposited on the cathodes 11. In the front substrate assembly 200 (200', 200") as a combination of a front substrate 20 and a nonconductive plate 23 (23', 23"), a plurality of anodes 21 are formed as stripes over the front substrate 20, and a phosphor 22 is deposited on each of the anodes 21. The nonconductive plate 23 having a plurality of gates 24 (24a) formed as stripes thereon is combined with the front substrate 20 by spacers 25.

The three embodiments of the present invention differ from each other in terms of the structure of the gates 24 formed over the nonconductive plate 23. For the first embodiment of FIG. 1, the gates 24 are formed as stripes over a single nonconductive plate 23. For the second embodiment of FIG. 2, the gates 24 are formed as stripes over a first nonconductive plate 23' which is relatively thinner than the nonconductive plate 23 used in the first embodiment, and then a second nonconductive plate 23" is placed over the gates 24. The third embodiment is similar to the first embodiment with the gates 24 formed as stripes over the nonconductive plate 23, except that the gates 24a extends the upper sidewalls of the nonconductive plate 23 which are exposed through openings. The configurations of the second and third embodiments are appropriate for the case where the thickness of the nonconductive plate 23 is relatively thick, because they provide the effect of making the distance between the carbon nanotubes 11' and the gates 24 (24a) narrow.

On the other hand, because the carbon nanotubes 11' have a low work function, and excellent durability and thermal stability, they serve as a good electron emitter source. The gates 24 are formed by depositing a metal over the nonconductive plate 23 made of photosensitive glass or ceramic substrate, and then by patterning the metal layer. When the rear substrate assembly 100 is combined with the front substrate assembly 200, the nonconductive plate 23 serves as a spacer, providing an appropriate distance between the carbon nanotubes 11' and the gates 24. Thus, there is no need to form spacers separately. In addition, because the front substrate assembly 200 with gates 24 is formed separately from the rear substrate assembly 100, the thin film formation can be simplified, and damage of carbon nanotubes by a thermal process during the thin film formation can be prevented.

Figure 4:
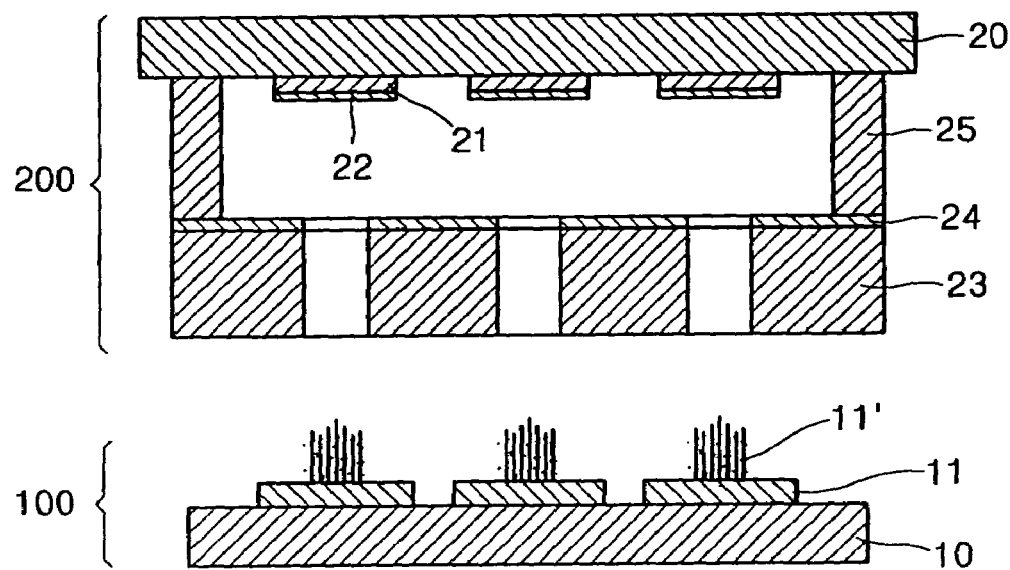
FIG. 4 is a sectional view illustrating a preferred embodiment of a method for manufacturing a field emission array with carbon nanotubes according to the present invention.

In fabricating the electron emission array with carbon nanotubes having a configuration described above, illustrated in FIG. 4, the rear substrate assembly 100 and the front substrate assembly 200 are separately manufactured, and then combined with each other. First, to form the rear substrate assembly 100, a metal layer is deposited over the rear substrate 10 and then patterned into cathodes 11 as stripes. Then, carbon nanotubes 11' are deposited at a constant distance on the cathodes 11.

Figure 5:
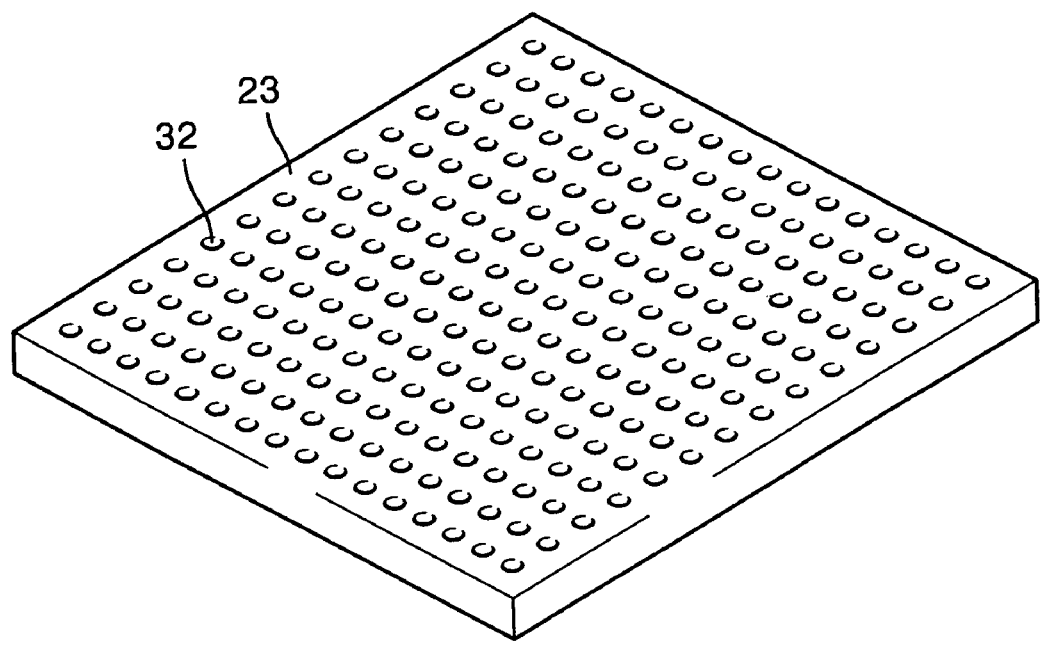
FIGS. 5 and 6 illustrate the formation of gates over the nonconductive plate shown in FIG. 4.
Figure 6:
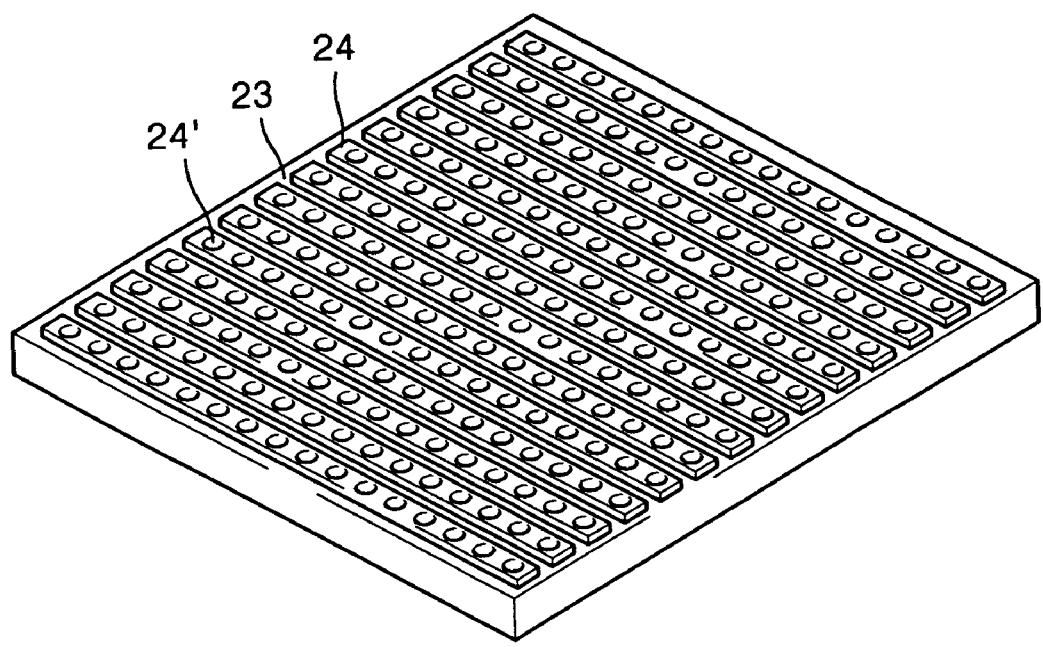

To form the front substrate assembly 200, a metal is deposited over the front substrate 20 and then patterned into anodes 21 as stripes. Then, a phosphor 22 is deposited on the anodes 21. Then, the structure with the anodes 21 is combined with the nonconductive plate 23 having the gates 24 with a predetermined distance therebetween using spacers 25. As shown in FIG. 5, a plurality of openings 32, which correspond to the anodes 21, are formed at a predetermined distance in the nonconductive plate 23. The gates 24 are formed as stripes on the nonconductive plate 23 with the plurality of openings 32. As shown in FIG. 6, the stripes of the gates 24 are perpendicular to the stripes of the anodes 21. In particular, a metal is deposited over the nonconductive plate 23 with the openings 32 and then patterned into the gates 24. The nonconductive plate 23 with the gates 24 has a plurality of emitter openings 24' corresponding to the openings in the nonconductive plate 32.

The field emission array fabrication according to the present invention has been described with reference to the configuration of the field emission array according to the first embodiment of the present invention, illustrated in FIG. 1. Either the rear substrate assembly 100 or the front substrate assembly 200 can be manufactured first, i.e., prior to the manufacture of the other assembly.

The fabrication of the field emission array according to the second embodiment, which is shown in FIG. 2, is the same as that of the first emission array shown in FIG. 1, except for the manufacture of the nonconductive plate 23. In particular, the gates 24 are formed as stripes over a first nonconductive plate 23' relatively thinner than the nonconductive plate 23 for the first embodiment, and then a second nonconductive plate 23" is mounted over the first nonconductive plate 23' having gates 24.

Figure 7:
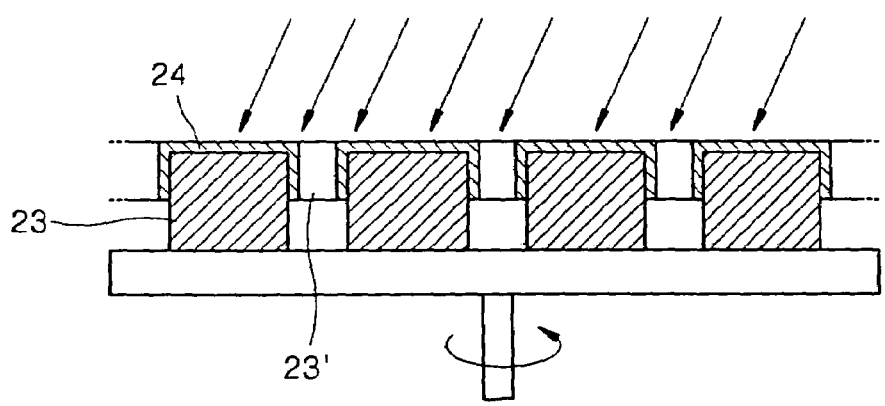
FIG. 7 illustrates a method of manufacturing a field emission array with carbon nanotubes according to the present invention incorporating a spint method.

The fabrication of the field emission array according to the third embodiment of the present invention, which is shown in FIG. 3, differs from the first embodiment in terms of the configuration of the gates 24 formed on the nonconductive plate 23. In particular, when the gates 24 are formed as stripes over the nonconductive plate 23 having the openings 32, as shown in FIG. 5, and is also adopted in the fabrication of the field emission array according to the first embodiment, a spint method is applied, as illustrated in FIG. 7, such that the metal serving as the gates is deposited (illustrated by the arrows of FIG. 7) on the upper sidewalls of the nonconductive plate 23 which are exposed through the openings 32. Then, the metal layer is patterned into the gates 24a as stripes, as illustrated in FIG. 3. Due to the shape of the gates 24a that extend the upper sidewalls of the nonconductive plate 23, the gates 24a and the carbon nanotubes 11' become closer.

Figure 8:
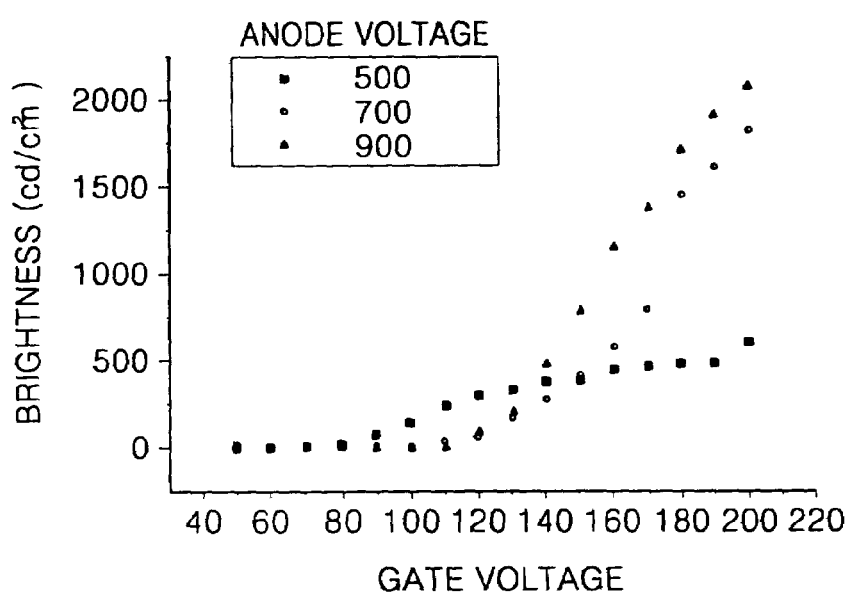
FIG. 8 is a graph illustrating the brightness of the field emission array according to the first embodiment of the present invention with respect to gate voltage variations at different anode voltage levels.
Figure 9:
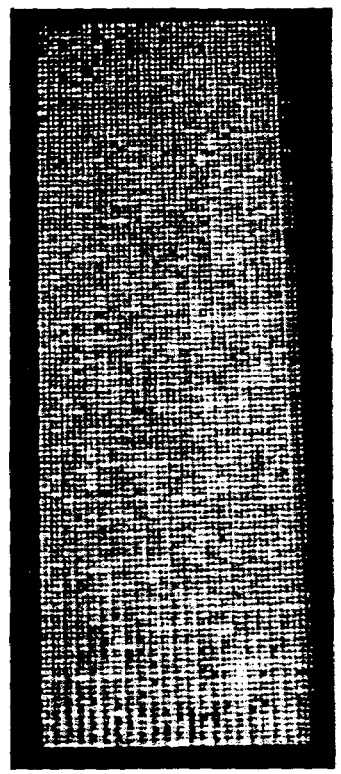
FIG. 9 is a front photo of the field emission array emitting light.

FIG. 8 is a graph illustrating the brightness of the field emission array according to the first embodiment of the present invention with respect to gate voltage variations at different anode voltage levels. In FIG. 8, as the anode voltage and gate voltage levels become higher, the brightness gradually increases up to 2000 cd/m$^2$ at a 200 V gate voltage and 900 V anode voltage. The front photo of the field emission array emitting light at that brightness level is shown in FIG. 9.

Figure 10:
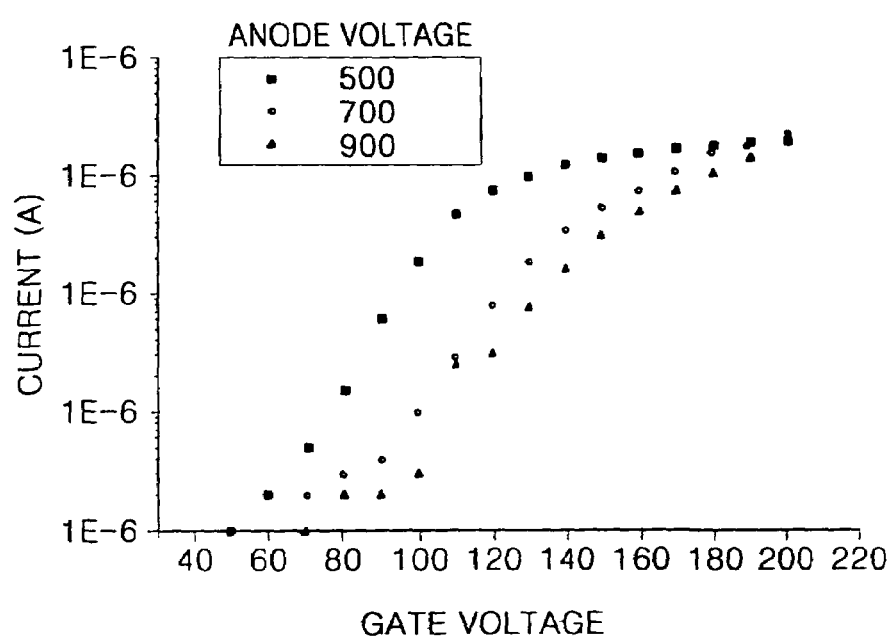
FIG. 10 is a graph illustrating the anode current flows at the field emission array according the third embodiment of the present invention with respect to gate voltage variations at different anode voltage levels, the field emission array having gates formed by tilt deposition.

FIG. 10 is a graph illustrating the anode current flows at the field emission array according the third embodiment of the present invention with respect to gate voltage variations at different anode voltage levels, the field emission array having gates formed by tilt deposition. As shown in FIG. 10, as the gate voltage level increases, anode current flow increases. The anode voltage level can be adjusted within the range of the gate voltage of 50–200 V.

As previously described, in the field emission array with carbon nanotubes as an electron emitter source, and the method for fabricating the field emission array according to the present invention, a rear substrate assembly is manufactured by forming cathodes as stripes on a rear substrate, and then by depositing carbon nanotubes on the cathodes. A front substrate assembly is manufactured by forming anodes as stripes on a front substrate and depositing a phosphor on the anodes; forming a plurality of openings in a nonconductive plate, and forming gates as stripes having a plurality of emitter openings corresponding to the plurality of openings in the nonconductive plate; and combining the front substrate with the nonconductive plate having the gates having a predetermined distance therebetween using spacers. Then, the rear substrate assembly and the front substrate assembly are combined so that the carbon nanotubes on the cathodes project through the emitter openings at a predetermined distance from the gates. This configuration of the field emission array according to the present invention ensures easy thin film deposition for carbon nanotubes, and prevents outgassing during the operation of the array.

While this invention has been particularly shown and described with reference to preferred embodiments thereof, it will be understood by those of ordinary skill in the art that various changes in form and details may be made to the present invention without departing from the spirit and scope of the invention as defined by the appended claims.

What is claimed is:

1. A method for fabricating a field emission array, comprising:
    forming a rear substrate assembly including:
        a rear substrate;
        a plurality of cathodes formed as stripes over the rear substrate; and
        a plurality of carbon nanotubes formed on the plurality of cathodes at a predetermined distance;
    forming a front substrate assembly including:
        a front substrate;
        a plurality of anodes formed as stripes over the front substrate;
        a plurality of phosphors deposited on the plurality of anodes;
        at least one nonconductive plate having a plurality of openings separated by a predetermined distance corresponding to the distance between each of the plurality of anodes;
        a plurality of gates formed as stripes perpendicular to the stripes of the plurality of anodes on the at least one nonconductive plate with a plurality of emitter openings corresponding to the plurality of openings in the at least one nonconductive plate; and
    combining the rear substrate assembly and the front substrate assembly so that the plurality of carbon nanotubes on the plurality of cathodes project through the emitter openings at a predetermined distance from the plurality of gates.

2. The method of claim 1, wherein forming the rear substrate assembly comprises:
    depositing a metal layer over the rear substrate by thin film formation;
    patterning the metal layer into the plurality of cathodes as stripes; and
    depositing the plurality of carbon nanotubes on the plurality of cathodes at a predetermined distance.

3. The method of claim 1, wherein forming the rear assembly further comprises providing a plurality of spacers for supporting and separating the at least one nonconductive plate having the plurality of gates from the rear substrate by a predetermined distance.

4. The method of claim 1, wherein forming the rear assembly further comprises providing a plurality of spacers for supporting and separating the at least one nonconductive plate having the plurality of gates from the front substrate by a predetermined distance.

5. The method of claim 4, wherein forming the at least one nonconductive plate and the rear substrate are in contact.

6. The method of claim 1, wherein forming the at least one nonconductive plate and the rear substrate are in contact.

7. The method of claim 1, wherein forming the front substrate assembly comprises:
   forming a plurality of openings separated by a predetermined distance in the at least one nonconductive plate; and
   depositing a metal layer over the at least one nonconductive plate having the plurality of openings and patterning the metal layer into the plurality of gates as stripes having the plurality of emitter openings corresponding to the plurality of openings in the at least one nonconductive plate.

8. The method of claim 1, wherein forming the front substrate assembly comprises:
   forming a plurality of openings separated by a predetermined distance in a first nonconductive plate;
   depositing a metal layer on the first nonconductive plate having the plurality of openings and patterning the metal layer into the plurality of gates as stripes having a plurality of emitter openings corresponding to the plurality of openings in the first nonconductive plate; and
   mounting a second nonconductive plate having a plurality of openings on the first nonconductive plate having the plurality of gates such that the plurality of openings of the second nonconductive plate correspond to the plurality of emitter openings.

9. The method of claim 1, wherein forming the front substrate assembly comprises:
   forming a plurality of openings separated by a predetermined distance in a first nonconductive plate;
   depositing a metal layer by a spin method on the top and upper sidewalls of the first nonconductive plate which are exposed through the plurality of openings; and
   patterning the metal layer into the plurality of gates as stripes having a plurality of emitter openings corresponding to the openings in the first nonconductive plate.

10. The method of claim 4, wherein forming the front substrate assembly comprises:
    depositing a metal layer over the front substrate;
    patterning the metal layer into the plurality of anodes as stripes;
    depositing the plurality of phosphors on the plurality of anodes;
    forming the plurality of gates as stripes on the at least one nonconductive plate; and
    combining the at least one nonconductive plate having the plurality of gates with the front substrate having the plurality of anodes and the plurality of phosphors using the plurality of spacers so that the at least one nonconductive plate and the front substrate are separated by a predetermined distance.

11. The method of claim 10, wherein forming the plurality of gates as stripes on the at least one nonconductive plate comprises:
    forming a plurality of openings separated by a predetermined distance in the at least one nonconductive plate; and
    depositing a metal layer over the at least one nonconductive plate having the plurality of openings and patterning the metal layer into the plurality of gates as stripes having the plurality of emitter openings corresponding to the plurality of openings in the at least one nonconductive plate.

12. The method of claim 10, wherein forming the gates as stripes on the at least one nonconductive plate further comprises:
    forming a plurality of openings separated by a predetermined distance in a first nonconductive plate;
    depositing a metal layer on the first nonconductive plate having the plurality of openings and patterning the metal layer into the plurality of gates as stripes having a plurality of emitter openings corresponding to the plurality of openings in the first nonconductive plate; and
    mounting a second nonconductive plate having a plurality of openings on the first nonconductive plate having the plurality of gates such that the plurality of openings of the second nonconductive plate correspond to the plurality of emitter openings.

13. The method of claim 10, wherein forming the gates as stripes on the at least one nonconductive plate comprising:
    forming a plurality of openings separated by a predetermined distance in a first nonconductive plate;
    depositing a metal layer by a spin method on the top and upper sidewalls of the first nonconductive plate which are exposed through the plurality of openings; and
    patterning the metal layer into the plurality of gates as stripes having a plurality of emitter openings corresponding to the openings in the first nonconductive plate.

* * * * *